United States Patent [19]

Reynolds et al.

[11] Patent Number: 5,378,673
[45] Date of Patent: Jan. 3, 1995

[54] METHOD FOR ATOMICALLY DISPERSING CATALYTIC METALS INTO SUPPORT MATERIALS

[75] Inventors: Stephen D. Reynolds; Claude C. Culross, both of Baton Rouge, La.

[73] Assignee: Exxon Research and Engineering Company, Florham Park, N.J.

[21] Appl. No.: 996,261

[22] Filed: Dec. 23, 1992

[51] Int. Cl.⁶ .................... B01J 37/02; B01J 37/08; B01J 23/56; B01J 23/74
[52] U.S. Cl. .................................. 502/174; 502/349; 502/352; 502/439
[58] Field of Search ............... 502/174, 349, 352, 439; 427/217, 229

[56] References Cited

U.S. PATENT DOCUMENTS 4,255,285  3/1981  Engelbach et al. ............. 502/352 X
5,021,392  6/1991  Daly et al. ......................... 502/439

FOREIGN PATENT DOCUMENTS 59-096696  6/1983  Japan .

Primary Examiner—Paul Lieberman
Assistant Examiner—Douglas J. McGinty
Attorney, Agent, or Firm—Henry E. Naylor

[57] ABSTRACT

A process for the atomic dispersion of metals into support materials, preferably silica, alumina, and amorphous and zeolitic alumino-silicates. The support material is contacted with an aqueous composition of a metal carbonate, or bicarbonate. This results in the metal being atomically dispersed in the support material.

8 Claims, No Drawings

METHOD FOR ATOMICALLY DISPERSING CATALYTIC METALS INTO SUPPORT MATERIALS

FIELD OF THE INVENTION

A method for dispersing metals into catalyst support materials containing sufficient acid functionality. The support material is preferably an inorganic refractory oxide based material, such as alumina. The support material is contacted with an aqueous composition of a metal compound having at least one anion which is carbonate or bicarbonate. This results in the metal being atomically dispersed into the support material.

BACKGROUND OF THE INVENTION

Much work has been done over the years to develop methods for dispersing catalytically active metals into catalyst support materials. It is generally believed that the better the dispersion of active metals, the more active the resulting catalyst will be. Various commercially successful impregnation methods are presently used to incorporate metals into support materials. One of the most commonly used methods is impregnation of the support by "incipient wetness", which requires a minimum of metal-containing solution so that the total solution is absorbed initially or after some evaporation. In another conventional method, the metal is incorporated into the support material by treating the so-called mull mix just prior to catalyst forming, preferably extrusion through an appropriate die.

While commercially viable techniques exist for incorporating metals into catalyst support materials, many of them suffer from the problem of merely adequate metal dispersion. In the worst cases detrimental metal agglomeration will occur, which leads to significant activity loss. Consequently, there still exists a need in the art for more effective methods for dispersing catalytic metals into catalyst support materials.

SUMMARY OF THE INVENTION

In accordance with the present invention, there is provided a method for atomically dispersing catalytically active metals into a catalyst support material. The method comprises treating the catalyst support material with an aqueous composition of a metal compound selected from metal compounds having at least one anion which is carbonate or bicarbonate, at an effective temperature and time, wherein said support material contains a sufficient amount of acid functionality to react with the metal compound, thereby resulting in the atomic dispersion of metal in the support material.

In a preferred embodiment of the present invention, the support material is an inorganic oxide, or a combination of oxides, selected from the group consisting of alumina, silica, amorphous and zeolitic alumino-silicates, titania, and zirconia.

In another preferred embodiment of the present invention, the treated support material is separated from the aqueous composition/support mixture and dried.

In still another preferred embodiment, the metal is selected from the group consisting of Pt, Ir, Re, and Sn and mixtures thereof.

In other preferred embodiments the metal is selected from the group consisting of Mo, W, Ni, Co, and Fe, and mixtures thereof.

DETAILED DESCRIPTION OF THE INVENTION

As previously mentioned, the present invention relates to an improved method for atomically dispersing catalytically active metals into catalyst support materials containing an effective amount of acidic functionality. The method involves only a single step, that is, the single step of treating the support material with a metal compound wherein at least one anion is a carbonate or bicarbonate. Any catalyst support material can be used in the practice of the present invention. Such support materials are typically inorganic refractory oxides used in such processes as reforming; hydroprocessing, including hydrotreating wherein one or more types of heteroatoms are removed from a petroleum stream; hydrocracking; hydroconversion; and fluid catalytic cracking. Preferred are support materials used for reforming and hydrotreating. Preferred support materials include carbon, alumina, silica, amorphous and zeolitic alumino-silicates, titania, and zirconia. More preferred is alumina. A preferred carbon would be a coal.

By effective amount of acidic functionality, we mean that the support material will contain at least that minimum level of acidic functionality which will chemically react with the carbonate or bicarbonate to result in the metal being atomically dispersed in the support material.

If it is desired to use a support material which does not inherently contain an effective amount of acidic functionality, then an effective amount of acidic functionality can be incorporated into the material by any appropriate technique. For example, if the support material is a material which does not inherently contain a sufficient amount of acidic functionality, the material can first be treated with a solution of a strong acid, such as sulfuric or nitric acid. The resulting acidic support material can then be contacted with the metal carbonate and or bicarbonate of the present invention, and the metal atomically dispersed therein. Support materials generally contain sufficient acidity present as surface hydroxyl functionality.

Any metal compound which contains at least one anion which is a carbonate or bicarbonate can be used in the practice of the present invention to atomically disperse the metal into the support material. Preferred are those wherein the metal is selected from Group VIII, preferably Fe, Ni and Co, more preferably Ni and Co; Group VIB, preferably Mo; Group IIB, preferably Zn, and Group IB, and preferably Ag and Cu. The most preferred metals are Pt, It, Re, Sn, Mo, Zn, Ni, Fe, and Co and mixtures thereof. The Groups referred to herein are Groups of the Periodic Table of the Elements as published by Sargent-Welch Scientific Co., catalog number S-18806, 1979 edition. When the support material is coal, the preferred metal carbonate is iron carbonate.

While a pre-manufactured metal carbonate can be used in the practice of the present invention, it may be desirable to prepare the carbonate just prior to its being contacted with the support material. This is because the preferred carbonate, with a support such as coal, is $FeCO_3$ which is unstable toward oxygen. Consequently, great difficulties would be encountered in obtaining pre manufactured iron carbonate having sufficient purity for use in the present invention. Other carbonates and bicarbonates are stable toward oxygen.

Any appropriate method may be used to prepare the metal carbonate or bicarbonate material. When the carbonate is iron carbonate, it is required that the starting materials be purged of air and the preparation be conducted in an inert environment because of the oxidatively unstable nature of the iron carbonate. The starting materials, for example iron(II) chloride or sulfate, and a soluble carbonate, such as sodium carbonate, are each separately dissolved in deoxygenated water. The two resulting solutions are combined and iron carbonate is formed as a white flocculate. The iron carbonate can then be recovered by any appropriate filtration technique, washed with deoxygenated water to remove excess sodium carbonate, sodium chloride, and sodium sulfate by-product.

The resulting iron carbonate can then be introduced into a slurry of support material containing at least an effective amount of water. An effective temperature and time is also needed to ensure substantial atomic dispersion of the metal into the support material. Preferred temperatures would be from about ambient temperature (about 22° C.) to about 300° C., preferably from about ambient temperature to about 200° C., and more preferably from about ambient temperature to about 150° C. Optionally, $CO_2$ pressure may be used to enhance solubility. Effective pressure would be from about atmospheric pressure to 400 psi $CO_2$, preferably from about atmospheric pressure to about 200 psi $CO_2$, and more preferably from about atmospheric pressure to 80 psi.

It is believed that the metal carbonate material used in the present invention is effective for atomically dispersing the metal into the support material because the carbonate/bicarbonate anion is basic enough to chemically react with the acid groups of the support material. The reaction is driven to completion in only one contacting step. The chemical reaction chemically bonds the metal to the support material. This results in the metal having the greatest possible dispersion in the support material; that is, atomic dispersion. This cannot be said of any of the prior art techniques for incorporating metals into support materials because prior art techniques typically use water-soluble metals salts, such as iron chloride, which are not basic enough to react with the acid groups of the support material. That is, there is no reaction with the acid functionality of the support material because the anions of such metal salts are generally non-basic. Even in those instances where the anion is basic, its basicity is so weak that the reaction is equilibrium-limited. In the former case, association of the metal and the support material must, by necessity, only be physical, with the attendant poor contact and dispersion. In the later case, it is believed that equilibrium limits the amount of chemical association to an extent far less than the full acid content of the support material, so that any metal over and above the equilibrium limitation will be physically deposited on the solid support material—again a relatively poor contact and dispersion.

Also, no other method produces a relatively harmless gas, $CO_2$, as its sole by-product, thus driving the metal dispersion reaction to completion. Only by practice of the present invention can a metal, such as iron, be atomically dispersed in a solid support material to such a degree that a substantial increase in activity results. Furthermore, in the catalyst forming step of the present invention, $CO_2$, a product of the reaction of carbonate with the support material, is collected overhead. In conventional processes, anions, such as chlorides and sulfates, remain in the system. Furthermore, anions such as chloride can present corrosion and catalyst activity problems. In contrast, there is no residue from the anion left in solution, or with the metal, by the practice of the present invention.

The following examples are provided for illustrative purposes and should not be taken as being limiting in any way.

EXAMPLE 1

2.129 g nickel carbonate and 10.0 g alumina support were slurried in 100 ml de-ionized water. The target nickel content of the sample was 10.5 parts nickel per 100 parts support.

The slurry was sealed under vacuum, and bubbling was immediately observed. After bubbling ceased, water was removed by evaporation. The dried material contained 1.59 wt % $CO_3^=$, indicating 78% reaction between nickel carbonate and alumina.

Evolution of gaseous $CO_2$ upon contact of virtually any carbonate mineral with an acid is a well known chemical reaction. For example, this is the fizzing observed when vinegar, which contains an organic carboxylic acid called acetic acid, is added to baking powder, which is sodium carbonate. In a similar manner, catalyst supports contain surface hydroxyl functionality possessing weak acidity with potential to react with metal carbonates (or bicarbonates). Metal carbonates, e.g. nickel carbonate, and support surface functionality in the aqueous composition of this invention undergo reaction, after which the metal is chemically bonded to the support. It is by this chemistry that metals become atomically dispersed, i.e., each metal is separated from every other metal on the surface.

EXAMPLE 2

3.098 g nickel carbonate and 20.0 g silica support (449 $m_2/g$) were slurried in 100 ml de-ionized water. The target nickel content of the sample was 7.7 parts nickel per 100 parts support.

The slurry was sealed under vacuum, and bubbling was immediately observed. After bubbling ceased, water was removed by evaporation. The dried material contained 0.196 wt % $CO_3^=$, indicating 96% reaction between nickel carbonate and silica.

EXAMPLE 3

0.1362 g $FeCl_2$ and 0.1253 g $Na_2CO_3$ were separately dissolved in water and then combined. The resulting white precipitate of $FeCO_3$ was filtered, washed, and added to a slurry of coal made from 11.87 g Rawhide coal (15.75 wt. % moisture; 10.00 g "dry" coal) slurried in 100 ml water. After transferring the $FeCO_3$ into the coal slurry, a hard vacuum was immediately pulled on the coal slurry for several minutes, and then a stopcock adapter was closed to seal the flask under vacuum. The slurry effervesced for several hours, indicating $CO_2$ evolution from reaction of $FeCO_3$ with coal.

Evolution of gaseous $CO_2$ upon contact of virtually any carbonate mineral with acid is a well known chemical reaction. For example, this is the fizzing observed when vinegar, which contains an organic carboxylic acid called acetic acid, is added to baking powder, which is sodium carbonate. Coals, too, contain carboxylic acids present as distinct groups within the organic structure. Iron carbonate and coal carboxylic acids in the aqueous composition of this invention undergo an acid-base neutralization reaction, after which iron is chemically bonded to the coal as an organic chelate (Equation 1). It is by this acid-base chemistry that iron becomes atomically dispersed, i.e., each iron is separated from every other iron.

The iron content of the sample was increased from 0.22 wt. % to 0.76 wt. % on a "dry" coal basis.

(Equation 1)

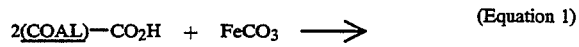

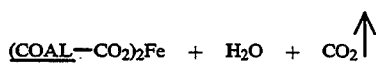

EXAMPLE 4

A sample of Rawhide coal containing a higher loading of iron was made by preparing $FeCO_3$ from 0.4539 g $FeCl_2$ and 0.3796 g $Na_2CO_3$ and reacting it with 11.87 g Rawhide coal (15.75 wt. % moisture; 10.00 g "dry" coal), as described in Example 3. The iron content of the sample was brought to 1.42 wt. %.

What is claimed is:

1. A method for atomically dispersing catalytically active metals into a support material, which method comprises: treating the support material with an aqueous composition of at least one metal compound selected from metal compounds having at least one anion which is a carbonate or bicarbonate, wherein the metal is selected from the metals consisting of those of Groups VIII, IIB, IB, and VIB of the Periodic Table of the Elements, at a temperature from about 22° C. to about 300° C. and at an effective time to allow complete evolution, by vacuum, of $CO_2$ by-product, wherein said support material contains a sufficient amount of acid functionality to react with the metal compound, thereby resulting in the atomic dispersion of metal in the support material.

2. The method of claim 1 wherein the support material is selected from the group consisting of carbon, alumina, silica, amorphous and zeolitic alumino-silicates, titania, and zirconia.

3. The method of claim 2 wherein the support material is selected from alumina, silica, and amorphous alumino-silicates.

4. The method of claim 2 wherein the treated support is separated from the spent aqueous composition.

5. The method of claim 2 wherein the metal is selected from the group consisting of Fe, Ni, Co, Mo, W, and Zn, and mixtures thereof.

6. The method of claim 2 wherein the metal is selected from the group consisting of Pt, Ir, Re, and Sn, and mixtures thereof.

7. The method of claim 5 wherein the support material is selected from alumina, silica, and amorphous alumino-silicates.

8. The method of claim 6 wherein the support material is selected from alumina, silica, and amorphous alumino-silicates.

* * * * *